(12) United States Patent
Cho et al.

(10) Patent No.: US 9,066,277 B2
(45) Date of Patent: Jun. 23, 2015

(54) METHOD AND APPARATUS FOR CONTROLLING NETWORK ACCESS OF UE IN WIRELESS COMMUNICATION SYSTEM

(75) Inventors: Song Yean Cho, Seoul (KR); Chae Gwon Lim, Seoul (KR); Han Na Lim, Seoul (KR); Sung Ho Choi, Suwon-si (KR); Beom Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 13/028,482

(22) Filed: Feb. 16, 2011

(65) Prior Publication Data
US 2011/0199898 A1 Aug. 18, 2011

(30) Foreign Application Priority Data
Feb. 16, 2010 (KR) ........................ 10-2010-0013749

(51) Int. Cl.
*H04W 48/06* (2009.01)
(52) U.S. Cl.
CPC ..................................... *H04W 48/06* (2013.01)
(58) Field of Classification Search
CPC ............ H04L 47/10; H04L 2012/5631; H04L 2012/5632; H04L 47/70; H04L 47/72; H04L 47/724; H04L 47/74; H04L 47/741; H04L 47/743; H04L 47/745; H04L 47/748; H04L 47/76; H04L 5/0053; H04L 5/0055
USPC ............ 370/229, 230, 235, 236, 236.1, 236.2
See application file for complete search history.

(56) References Cited

U.S. PATENT DOCUMENTS

| 2002/0041568 | A1 | 4/2002 | Bender | |
|---|---|---|---|---|
| 2009/0028060 | A1 | 1/2009 | Beckmann et al. | |
| 2009/0190518 | A1 | 7/2009 | Kim et al. | |
| 2010/0075635 | A1* | 3/2010 | Lim et al. ...................... | 455/411 |
| 2011/0058480 | A1* | 3/2011 | Dahlen .......................... | 370/237 |
| 2011/0106946 | A1* | 5/2011 | Bao et al. ...................... | 709/225 |
| 2011/0199905 | A1* | 8/2011 | Pinheiro et al. ............... | 370/235 |
| 2012/0069737 | A1* | 3/2012 | Vikberg et al. ............... | 370/232 |

FOREIGN PATENT DOCUMENTS

KR  10-2009-0046035 A  5/2009

* cited by examiner

*Primary Examiner* — Chi H Pham
*Assistant Examiner* — Weibin Huang
(74) *Attorney, Agent, or Firm* — Jefferson IP Law, LLP

(57) ABSTRACT

A method and an apparatus for controlling network access of a User Equipment (UE) based on the network's load and time tolerance (delay tolerance) are provided. A network access method for a terminal in a wireless communication system includes sending an access request message containing a time-tolerant indicator at a predefined time, determining, when a reject message is received, a cause value and a hold time contained in the reject message, and re-sending the access request message after the hold time elapses.

31 Claims, 5 Drawing Sheets

US 9,066,277 B2

METHOD AND APPARATUS FOR CONTROLLING NETWORK ACCESS OF UE IN WIRELESS COMMUNICATION SYSTEM

PRIORITY

This application claims the benefit under 35 U.S.C. §119 (a) of a Korean patent application filed on Feb. 16, 2010 in the Korean Intellectual Property Office and assigned Serial No. 10-2010-0013749, the entire disclosure of which is hereby incorporated by reference.

BACKGROUND OF THE INVENTION

1. Field of the Invention

The present invention relates to wireless communications. More particularly, the present invention relates to a method and an apparatus for controlling network access of a User Equipment (UE) based on the network's load and time tolerance (delay tolerance).

2. Description of the Related Art

When a Machine Type Communication (MTC) or a Machine To Machine (M2M) device, or a User Equipment (UE) and a normal UE attempt to access a network simultaneously, there is a need to restrict the device's access to the network based on the network load in a wireless communication system. That is, if the MTC device has the time tolerant feature, the wireless communication system should restrict the MTC device's access to the network and/or the sending of data towards the MTC device and should limit the amount of data that the MTC device can transfer.

When restricting the service to the MTC device, the network load configuration values are used as thresholds to start the service restriction according to the subscriptions of the MTC device. For example, in a case of the MTC device (e.g., metering device) which reports measurement results periodically, the network load configuration value for the service restriction to the subscription having the time tolerance level which requires reporting of the entire utilization of a day, should differ from the network load configuration value for the service restriction to the subscription having the time tolerance level which requires reporting at a time interval set under contract of the dynamic billing policy.

In the related art, however, it is impossible to set the network load configuration values for the network use restrictions of the MTC device to different values individually according to the time tolerant levels of the subscriptions. Accordingly, it is difficult to expect good efficiency of the access barring which is performed, in the wireless communication system of the related art, to restrict the network access of the MTC device when the network congestion reaches a predefined level. That is, the network access control method of the related art has a drawback in that it is impossible to set the time tolerant level per MTC device or per subscription of the MTC device.

Therefore, a need exists for a method and an apparatus for controlling network access of MTC devices with time tolerant feature in a wireless communication system that is capable of restricting the MTC devices' network access, for sending of data towards MTC devices, and for limiting the amount data that the MTC device can transfer.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for controlling network access of Machine Type Communication (MTC) devices with a time tolerant feature in a wireless communication system that is capable of restricting the MTC devices' network access, for sending of data towards MTC devices, and for limiting the amount data that the MTC device can transfer.

Another aspect of the present invention is to provide a method and an apparatus for controlling network access of MTC devices with a time tolerant feature that is capable of controlling access barring efficiently for the devices when the network load is high. For this purpose, the load threshold for restricting the access to the network is set dynamically according to the time tolerant level per subscription.

In accordance with an aspect of the present invention, a network access method for a terminal in a wireless communication system is provided. The network access method includes sending an access request message containing a time-tolerant indicator at a predefined time, determining, when a reject message is received, a cause value and a hold time contained in the reject message, and re-sending the access request message after the hold time elapses.

The cause value indicates an entity in an overload status, and the entity includes at least one of an evolved Node B (eNB), a Mobility Management Entity (MME), a Serving-Gateway (S-GW), and a Packet data network Gateway (P-GW). The access request message includes at least one of a Radio Resource Control (RRC) request message, an attach request message, a service request message, and a tracking area update message.

The method may further include configuring a tolerant level, a weight factor penalty, a hold time penalty, receiving barring information having a weight factor and a holding time, and configuring a time for sending the access request message by comparing the received barring information with the configured tolerant level and weight factor. The configuring of the time for sending the access request message includes waiting when the weight factor is greater than (>) the tolerant level, for the hold time before retrying network access. The configuring of the time for sending the access request message includes generating, when the weight factor is less than (<) the tolerant level, random access numbers as much as weight factor penalty, setting, when all the random access numbers are larger than the weight factor, the time for sending the access request message, and waiting, when any one of the random access numbers is smaller than the weight factor, for the hold time before retrying network access.

In accordance with another aspect of the present invention, a network access control method of a base station in a wireless communication system is provided. The network access control method includes receiving an overload start message having a hold time from an MME, receiving an RRC connection request message from a terminal, and sending, when the RRC connection request message includes a time-tolerant indicator, an RRC connection release message containing a hold time to the terminal, wherein the terminal retries network access after the hold time elapses.

The RRC connection release message may include a cause value which indicates an entity in an overload status, the entity includes at least one of an eNB, an MME, an S-GW, and a P-GW, and the hold time is a time configured according to the cause value.

In accordance with another aspect of the present invention, a network access control method of an MME in a wireless communication system is provided. The network access control method includes receiving a Non-Access Stratum (NAS) request message from a terminal, determining, when the NAS request message includes at least one of a time-tolerant indicator, load level of the MME, an S-GW and/or a P-GW, sending, when the load level is equal to a configured load level, a reject message containing a hold time to the terminal, and controlling the terminal to retry network access after the hold time elapses.

The reject message may include a cause value which indicates an entity in an overload status, the entity includes at least one of an eNB, an MME, an S-GW, and a P-GW, and the hold time is a time configured according to the cause value. The NAS request message includes at least one of an attach request message, a service request message, and a tracking area update message.

In accordance with another aspect of the present invention, a network access control apparatus for a wireless communication system is provided. The network access control apparatus includes a terminal for sending an access request message containing a time-tolerant indicator at a predefined time, for determining, when a reject message is received, a cause value and a hold time contained in the reject message, and for re-sending the access request message after the hold time elapses, and an eNB for receiving a network connection request message from the terminal and for sending, when the network is in an overload status, a reject message having a hold time.

The network access control apparatus may further include an MME for sending, when a load level of any one of the MME, an S-GW, or a P-GW is equal to configured load level, an overload start message to the eNB.

The reject message may include a cause value which indicates an entity in an overload status, the entity includes at least one of an eNB, an MME, an S-GW, and a P-GW, and the hold time is a time configured according to the cause value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
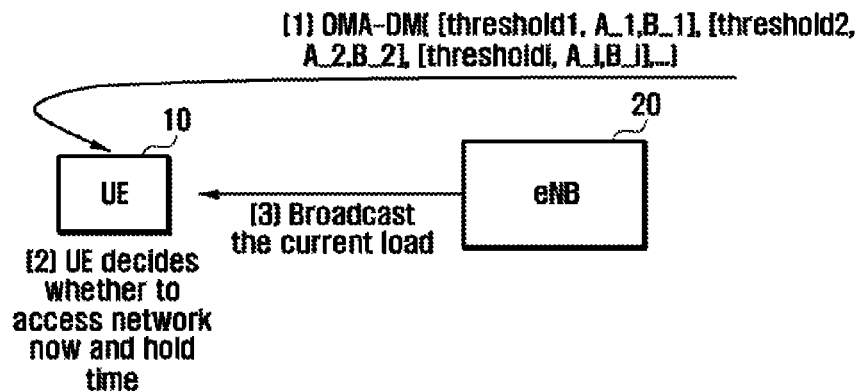
FIG. 1 is a diagram illustrating a principle of a User Equipment (UE)-decisive network access control method according to an exemplary embodiment of the present invention.

FIG. 1 is a diagram illustrating a principle of a User Equipment (UE)-decisive network access control method according to an exemplary embodiment of the present invention.

Referring to FIG. 1, a UE 10, if it supports a time tolerant (or delay tolerant) feature, sends the access request message to the evolved Node B (eNB) 20 along with its time tolerant capability. If it is transmitted in an Access Stratum (AS) signaling, the access request message can be a Radio Resource Control (RRC) connection request message. In contrast, if it is transmitted in a Non-Access Stratum (NAS) signaling, the access request message can be an Attach Request Message or a Service Request message. In a case where the network load reaches the load threshold, the eNB 20 transmits a reject (connection release) message to the UE 10, and the reject message (hereinafter, the term "connection release" is used interchangeably) can contain a cause value indicating the rejected reason and a hold time. The cause value can be the information on the Mobility Management Entity (MME) overload, Serving Gateway/Packet Data Network Gateway (S-GW/P-GW) overload, or eNB overload. The UE 10 determines the reason of the network load by analyzing the cause value contained in the reject message and waits for the hold time to re-request the access. At this time, the UE 10 can reselect a cell (an eNB, or a Radio Access Network (RAN)) or a Public Land Mobile Network (PLMN) rather than requesting retrial of the network access.

The UE 10 configures a time tolerant level (or a delay tolerant level), a weight factor penalty, and a hold time penalty. If the network load within the eNB reaches the load threshold, the eNB 20 broadcasts barring information containing the Identifications (IDs) of classes and services to be barred, the weight factor indicating the current load status, and the hold time for which the barred UE waits before retrial.

If the barring information is received, the UE 10 compares its tolerant level and weight factor with those contained in the barring information. That is, the UE 10 compares its UE-specific load threshold with the current network load of the eNB 20 to decide whether to access the network or not. According to the relationship between the weight vector of the UE 10 and the tolerant level, the UE 10 can operate as follows:

If the weight factor is greater than (>) the tolerant level, the UE waits for the hold time before retrial of the network access. Here, the hold time can be the value obtained by adding a UE-specific hold time penalty to the received hold time. If the weight factor is less than (<) the tolerant level, the Machine Type Communication (MTC) UE generates random access numbers as much as random factor penalty. At this time, if all the random access numbers are greater than the weight factor, the MTC UE tries to access the network. In contrast, if any one of the random access numbers is less than the weight factor, the MTC UE waits for the hold time before retrial of the network access.

Thereafter, the UE 10 sends the access request message to the eNB 20 at a predefined time. If the access request message is received, the eNB 20 determines whether the eNB-specific network load has reached the network load threshold (network load configuration value) and, if the eNB-specific network load has reached the network load threshold, sends the reject message to the UE 10. Here, the reject message can include a cause value and a hold time. When the reject message is received, the UE 10 can retry access to the network after waiting for the hold time.

Figure 2:
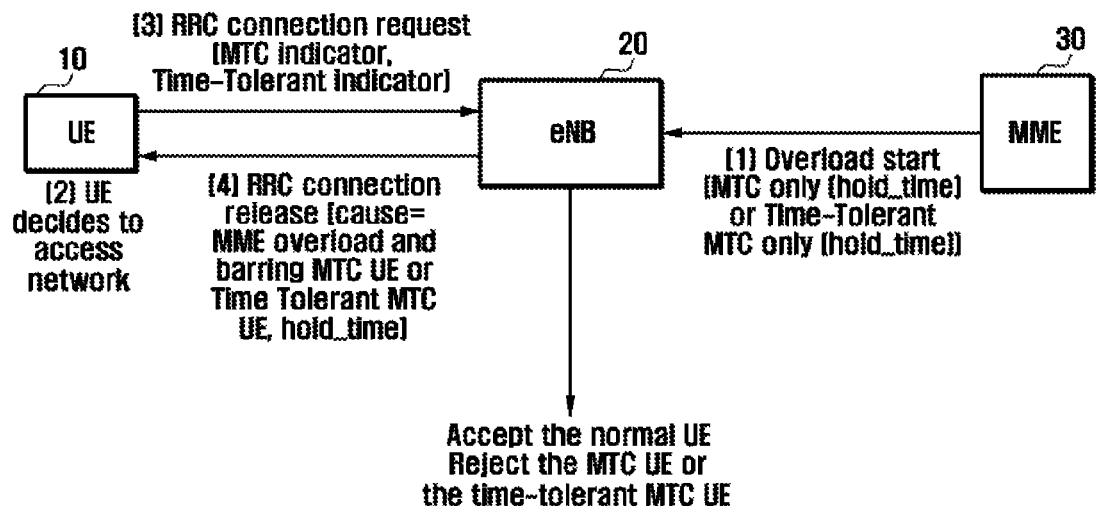
FIG. 2 is a diagram illustrating a principle of a network-decisive network access control method in an Access Stratum (AS) level according to an exemplary embodiment of the present invention.

FIG. 2 is a diagram illustrating a principle of a network-decisive network access control method in an AS level according to an exemplary embodiment of the present invention.

Referring to FIG. 2, an eNB 20 receives overload start messages of MME, SGW, and P-GW that are sent by the MME 30. If the overload start messages are received, the eNB sends a reject message to the UE 10. At this time, the reject message can contain the cause value and hold time information. Here, the cause value can be the information on the MME overload, SGW/P-GW overload, and/or eNB overload. In this case, the hold time carried by the reject message can be the hold time corresponding to the cause value. For example, the hold time can be the eNB-specific hold time for the eNB overload or the MME-specific hold time for the MME overload.

The MME 30 configures the load threshold of the MME 30 and the P-GW/SGW. Next, the MME 30 receives the current load status piggybacked in the messages from the SGW/P-GW. The MME 30 then determines whether the current load of the MME or the SGW/P-GW is greater than the network load threshold and, if the current load of the MME or the SGW/P-GW is greater than the network load threshold, sends an overload start message (including MTC UE, hold time, and weight factor information) to the eNB 20.

In this state, if the UE 10 generates an RRC connection request message including an MTC UE indicator and time-tolerant indication, the eNB 20 sends an RRC connection release message to the UE 10. That is, if the overload start message is received from the MME 30 or the eNB 20 is in the overload state, the eNB rejects the RRC connection request as the service request of the UE 10. If the RRC release request message is received, the UE retries to access the network after waiting for the hold time.

Figure 3:
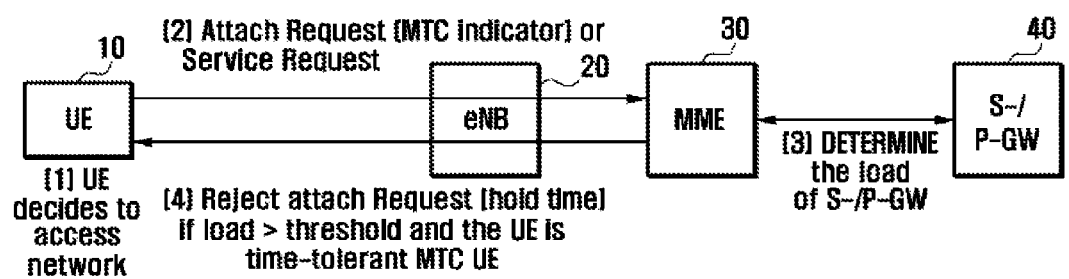
FIG. 3 is a diagram illustrating a principle of a network-decisive network access control method in a Non-Access Stratum (NAS) level according to an exemplary embodiment of the present invention.

FIG. 3 is a diagram illustrating a principle of a network-decisive network access control method in an NAS level according to an exemplary embodiment of the present invention.

Referring to FIG. 3, if overload is detected at the MME, SGW, or P-GW, an MME 30 sends an overload start message to the eNB 20. In this state, if the UE 10 sends a NAS attach request message, the MME 30 sends a reject message containing the cause value and the hold time to the UE 10. At this time, the overload can be a network entity-specific hold time configured by the MME, SGW, or P-GW. If the reject message is received, the UE 10 retries to access the network to send the NAS message after waiting for the hold time. As mentioned above, the NAS request message can be the attach request message, the service request message or tracking area update message.

The MME 30 receives the current load status of the S-GW/P-GW 40 piggybacked in the messages from the S-GW/P-GW 40. Meanwhile, the UE 10 sends an attach request or service request message to the MME 30 via the eNB 20. At this time, if the UE 10 is an MTC UE and supports time-tolerant function, the attach request or service request message can contain an MTC UE indicator and a time-tolerant indicator. If the attach request or service request message is received, the MME 30 delivers the request message to the S-GW/P-GW 40 and receives the load status information of the S-GW/P-GW 40 in response to the request message. The MME 30 also acquires the subscription information to determine the load levels of the MME 30 and S-GW/P-GW 40 as the threshold for MTC UE's barring is included in the subscription of the UE.

Thereafter, the MME 30 determines whether the current load level of the MME or S-GW/P-GW is greater than the threshold value set in the UE's subscription and, if it is, generates a reject message (attach reject or service reject message) and sends the reject message to the UE 10. If the reject message is received, the UE 10 retries to access the network after waiting for the hold time.

Figure 4:
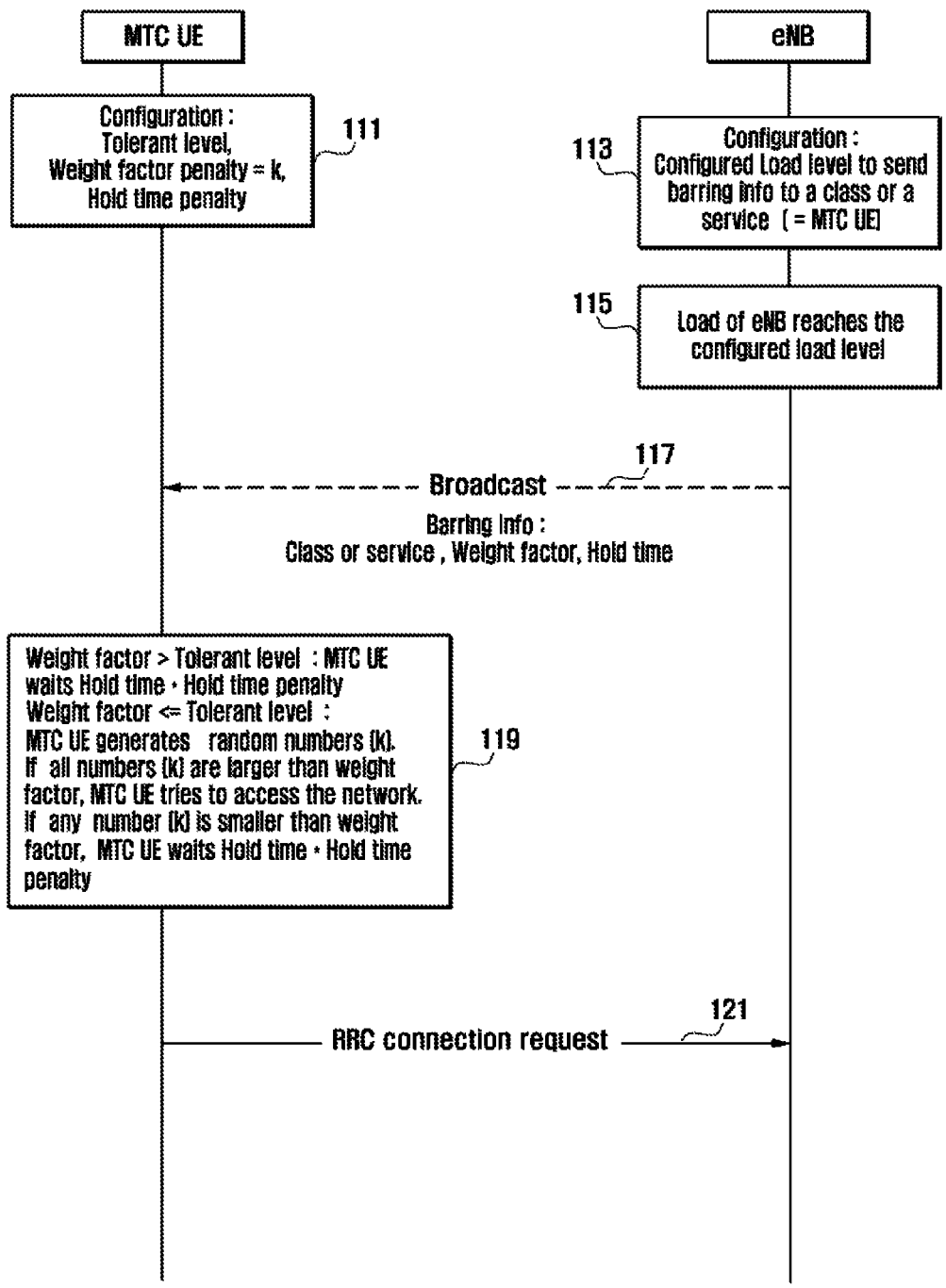
FIG. 4 is a signaling diagram illustrating a UE-decisive network access control method according to an exemplary embodiment of the present invention.

FIG. 4 is a signaling diagram illustrating a UE-decisive network access control method according to an exemplary embodiment of the present invention.

Referring to FIG. 4, an MTC UE first configures UE-specific time tolerant level, weight factor penalty, and hold time penalty in step 111. Meanwhile, the eNB configures the eNB-specific load level to start barring for the class or service corresponding to the MTC UE in step 113.

Thereafter, if the network load of the eNB reaches the eNB-specific load level, the eNB detects this status in step 115 and configures the class or service ID indicating the MTC UE, the weight factor indicating the current load status, and the holding time for which the UE waits for before retrial. If the load of the MME, S-GW, or P-GW reaches the load level, the eNB receives the overload start message from the MME 30. In step 117, the eNB broadcasts the configured barring information including class or service and hold time.

If the barring information is received, the UE compares the weight factor with the tolerant level configured in the UE in step 119. That is, the UE compares the current load of the eNB with the UE-specific load level and controls network access based on the comparison result. The UE can operate as follows according to the relationship of the weight factor and the tolerant level:

If the current load of the eNB is greater than the load level configured in the UE, i.e., if the weight factor >the tolerant level, the MTC UE waits for the time calculated by multiplying the hold time with the hold time penalty.

Secondly, if the current load of the eNB is less than the load level configured in the UE, i.e., if the weight factor <the tolerant level, the MTC UE generates random access numbers as much as random factor penalty, compares the random access numbers with weight factor, and controls network access based on the comparison result. If all random access numbers (k) are larger than the weight factor, the MTC UE tries to access the network. In contrast, if any number (k) is smaller than the weight factor, the MTC UE waits for the time duration calculated by multiplying the hold time with the hold time penalty (hold time*hold time penalty).

If it is determined in step 119 to access the network, the UE sends the eNB a request message for establishing the connection to the network in step 121. The request message can be an AS message or an NAS message and include the time-tolerant indication. The AS message can be the RRC connection request message, and the NAS message can be the attach request message, the service request message or tracking update message.

If it is determined that the UE has the time controlled feature which allows accessing the network at a predefined time and if the predefined time expires, the UE may not apply the hold time penalty, both the hold time nor the hold time penalty, or the weight factor.

After sending the network connection request, the UE may receive the reject message (or connection release message) from the eNB. This can be the case where the overload is detected in the eNB, MME, S-GW, or P-GW. As mentioned above, the reject message can include only the cause value and the hold time. If the reject message is received, the UE waits for the hold time before retrying to access the network.

Figure 5:
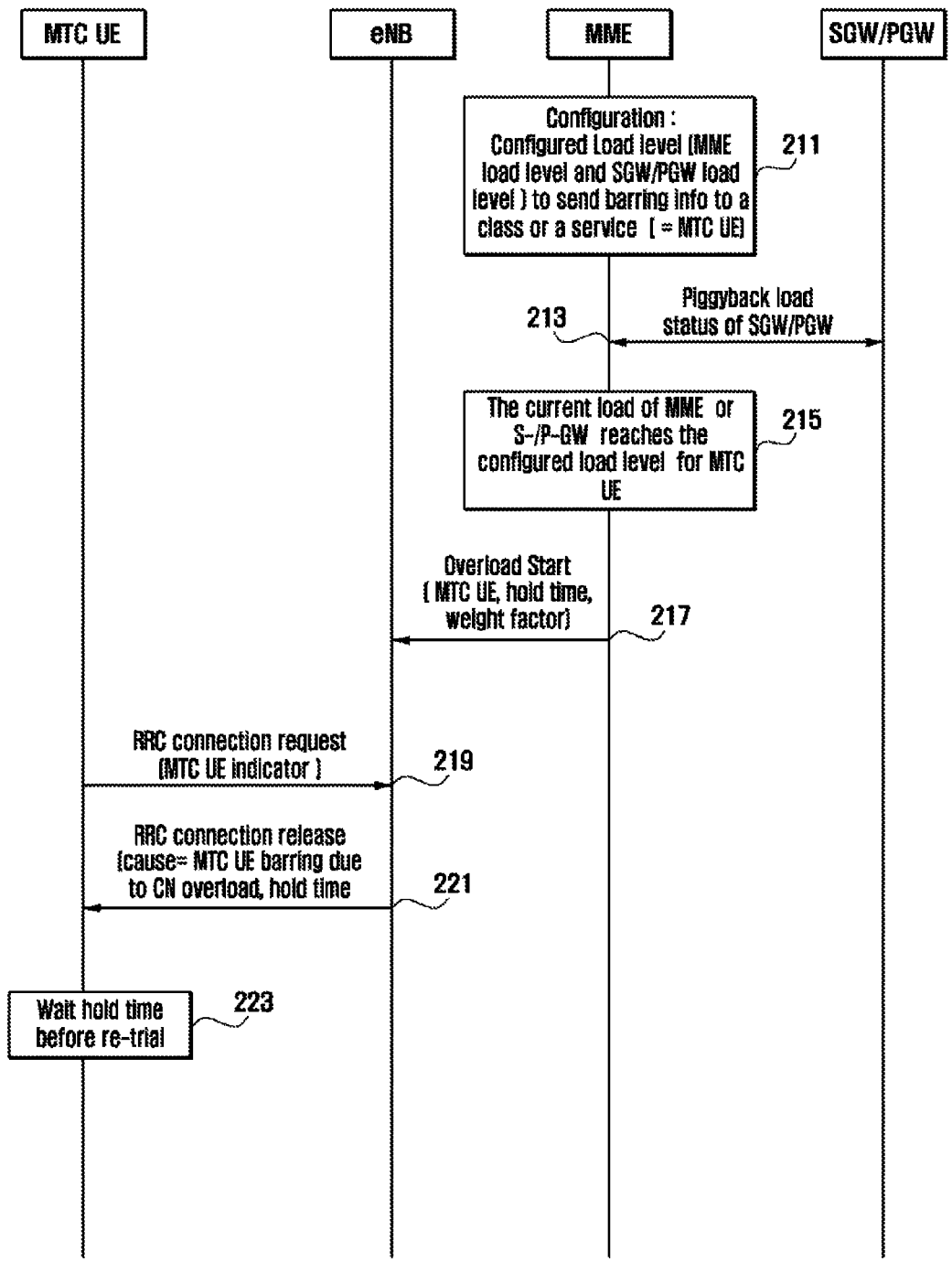
FIG. 5 is a signaling diagram illustrating an evolved Node B (eNB)-decisive network access control method in an AS level according to an exemplary embodiment of the present invention.

FIG. 5 is a signaling diagram illustrating an eNB-decisive network access control method in an AS level according to an exemplary embodiment of the present invention.

Referring to FIG. 5, in step 211, an MME configures the MME load level and P-GW/S-GW load level to send the barring information to the class or service corresponding to the MTC UE. In step 213, the MME receives the current load status of the S-GW and P-GW which is piggybacked in the messages from the S-GW and/or P-GW while serving other UE.

Thereafter, the MME monitors the network and, if it is determined in step 215 that the current MME or S-GW/P-GW load reaches the configured load level for the MTC UE, sends the overload start message to the eNB in step 217. That is, when the current load status of the MME or the S-GW/P-GW is greater than the configured load level, the MME permits only the network access of the normal UEs and thus sends the overload start message to the eNB for barring the MTC UE. Here, the overload start message can include the MTC UE indicator to indicate the MTC UE to be barred, the cause value to indicate the reason of the overload, and the hold time configured based on the time for the overload to be addressed which is estimated with a probability calculation. The overload start message can further include the weight factor indicating the current load status.

Thereafter, in step 219, if an RRC connection request message containing the MTC UE indicator is received from the MTC UE, the eNB sends an RRC connection release message to the UE in response to the RRC connection request message in step 221. That is, when the overload start message is received from the MME or the eNB is in the overload status, the eNB rejects the RRC connection request as the service request from the MTC UE. The RRC connection release message sent by the UE can include the cause value indicating the MTC UE barring due to the Core Network overload and the hold time indicating the time for the overload to be solved during which the MTC UE waits for retrial of the network access.

Upon receipt of the RRC release message, the UE waits for the hold time before retrial in step 223. Here, the UE can apply a penalty to the hold time according to the time tolerance level of the UE service as in the UE-decisive access control method described with reference to FIG. 4. As mentioned above, the UE can attempt to access another reselected cell (i.e., another eNB).

Figure 6:
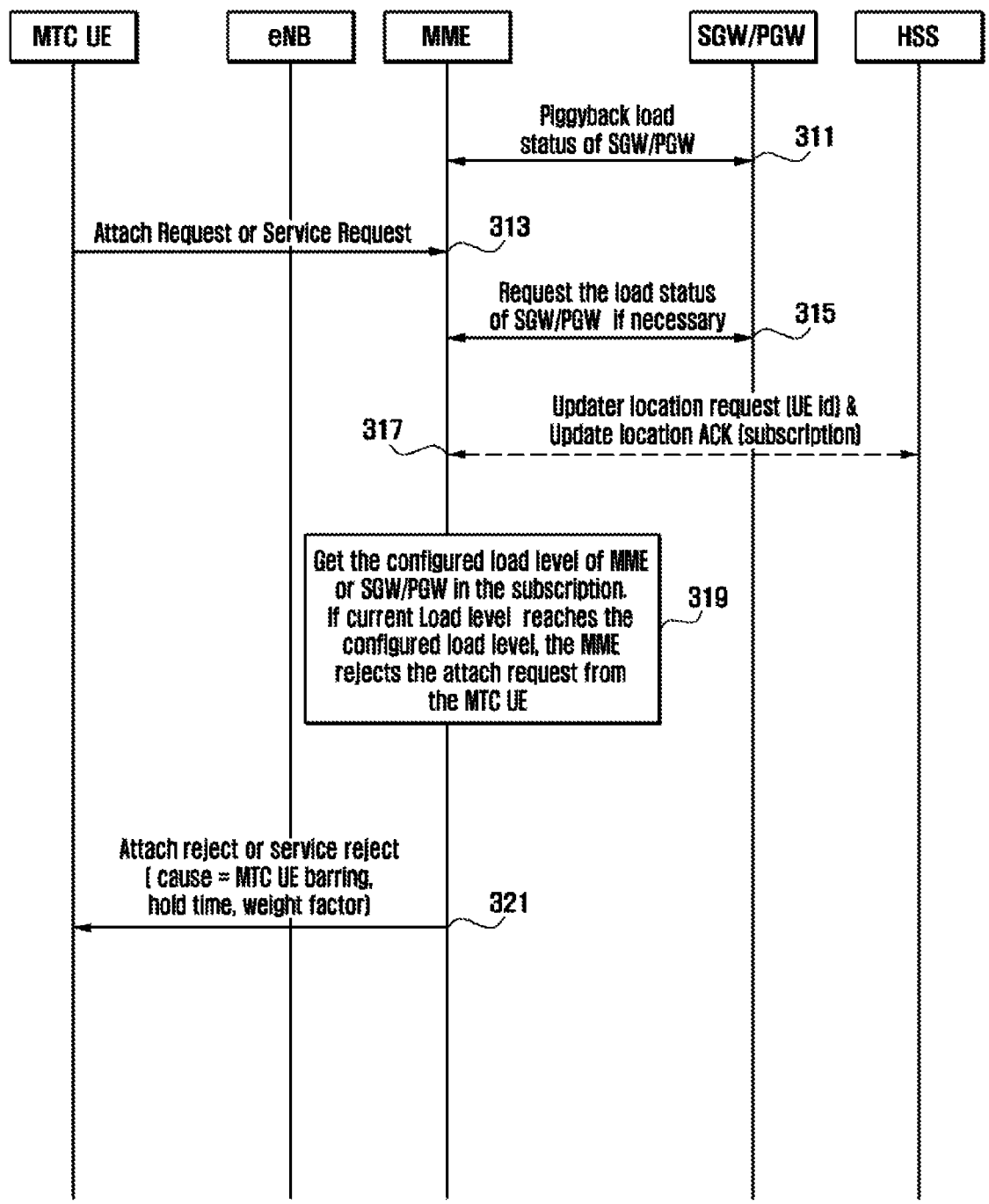
FIG. 6 is a signaling diagram illustrating a network-decisive network access control method in a NAS level according to an exemplary embodiment of the present invention.

FIG. 6 is a signaling diagram illustrating a network-decisive network access control method in an NAS level according to an exemplary embodiment of the present invention.

Referring to FIG. 6, in step 311, an MME receives the information on the current load status of the S-GW/P-GW which is piggybacked in the messages from the S-GW/P-GW while serving other UEs.

Thereafter, the MME receives an attach request message or a service request message transmitted by an MTC UE in step 313. In a case where the S-GW/P-GW load status information stored in the MME is older than a predefined age, the MME sends a load status request message to the S-GW/P-GW and receives the S-GW/P-GW load status information in step 315.

In addition, the MME acquires the information of the MME and S-GW/P-GW load levels for barring the MTC UE included in the UE's subscription by exchanging updater location request (UE id) and update location Acknowledgment ACK (subscription) messages with the HSS in step 317. In a case where the UE has sent the service request, the MME skips step 317 since it has the information on the UE's subscription.

Thereafter, the MME determines whether the current load level of the MME or S-GW/P-GW is greater than the configured value for the UE's subscription and, if it is, sends a reject message (attach reject or service reject message) to the MTC UE in step 321. That is, the MME gets the configured load level of the MME or S-GW/P-GW in the subscription and, if the load level reaches the configured load level in step 319, the MME rejects the attach request from the MTC UE in step 321. At this time, the reject message can include the cause value indicating the MTC UE barring due to the Core Network overload and the hold time indicating the time for the overload to be solved during which the MTC UE waits for retrial of the network access.

Upon receipt of the reject message, the UE waits for the hold time before retrial. When retrying to access the network, the UE can apply a penalty to the hold time according to the time tolerance level of the UE service as in UE-decisive access control method described with reference to FIG. 4.

As described above, the network access control method of an exemplary embodiment of the present invention configures the load threshold for restricting network access with different values according to time tolerant level of subscription, thereby efficiently controlling access barring to UEs when the network load reaches to the load threshold. That is, the network access control method of an exemplary embodiment of the present invention is advantageous to control the network access of the UEs efficiently according to the time tolerant level per MTC device or per MTC device's subscription.

While the invention has been shown and described with reference to certain exemplary embodiments thereof, it will be understood by those skilled in the art that various changes in form and details may be made therein without departing from the spirit and scope of the invention as defined by their appended claims and their equivalents.

What is claimed is:

1. A network access method for a user equipment (UE) in a wireless communication system, the method comprising:
   transmitting an access request message to a base station;
   receiving a reject message from the base station;
   determining, if the reject message is received, a hold time contained in the reject message; and
   transmitting a new access request message after the hold time elapses,
   wherein the reject message is received from the base station, if the base station receives a message for rejecting access request messages of a specific UE from a mobility management entity (MME) to control an overload of the MME, and
   wherein the access request message comprises an access stratum (AS) message including a time-tolerant indication.

2. The method of claim 1, wherein the access request message comprises a time-tolerant indicator, wherein the reject message comprises a cause value which indicates an entity in an overload status, and wherein the entity comprises at least one of the base station, the MME, a Serving-Gateway (S-GW), and a Packet Data Network Gateway (P-GW).

3. The method of claim 1, wherein the access request message comprises a radio resource control (RRC) request message.

4. The method of claim 1, wherein the transmitting of the new access request message comprises transmitting, if a weight factor included in barring information broadcasted by the base station is greater than (>) a tolerant level of the UE, the access request message after the hold time elapses.

5. The method of claim 1, wherein the transmitting of the new access request message after the hold time elapses comprises:
   generating, if a weight factor included in barring information broadcasted by the base station is less than (<) a tolerant level of the UE, random access numbers as much as the weight factor;
   setting, if all the random access numbers are larger than the weight factor, the time for transmitting the access request message; and
   waiting, if any one of the random access numbers is smaller than the weight factor, for the time before transmitting the access request message.

6. The method of claim 1, where the message for rejecting the access request messages of the specific UE comprises an OVERLOAD START message.

7. The method of claim 1, wherein the specific UE comprises a machine type communications (MTC) device.

8. The method of claim 1, wherein the reject message comprises an RRC connection release message.

9. The method of claim 1, wherein the access request message is transmitted at a time configured by the UE by comparing a weight factor included in barring information broadcasted by the base station with a tolerant level of the UE.

10. The method of claim 1, wherein the transmitting of the new access request message after the hold time elapses comprises:
    configuring a tolerant level, a weight factor penalty, and a hold time penalty;
    receiving barring information having a weight factor and the hold time; and
    configuring a time for transmitting the access request message by comparing the received barring information with the configured tolerant level and weight factor.

11. A network access control method of base station in a wireless communication system, the method comprising:
    receiving an overload start message having a hold time from a mobility management entity (MME);
    receiving an access request message from a user equipment (UE); and
    transmitting, if the UE is a specific UE indicated by the overload start message, a reject message containing the hold time to the UE,
    wherein the hold time contained in the reject message is used by the UE for transmitting the access request message after the hold time elapses,
    wherein the overload start message is received for rejecting the access request messages of a specific UE to control an overload of the MME, and
    wherein the access request message comprises an access stratum (AS) message including a time-tolerant indication.

12. The method of claim 11, wherein the reject message comprises a cause value which indicates an entity in an overload status, the entity comprising at least one of the base station, the MME, a Serving-Gateway (S-GW), and a Packet data network Gateway (P-GW), and the hold time is a time configured according to the cause value.

13. The method of claim 11, wherein the specific UE is machine type communications (MTC) device.

14. The method of claim 11, wherein the receiving of the access request message comprises:
    broadcasting barring information having a weight factor and the hold time; and
    receiving the RRC connection request message at a time configured by the UE by comparing the weight factor with a tolerant level of the UE.

15. The method of claim 11, wherein the transmitting of the reject message comprises:
    determining, if the access request message includes a time-tolerant indicator, the UE is the specific UE.

16. The method of claim 11, wherein the reject message comprises an RRC connection release message.

17. An overload control method of a mobility management entity (MME) in a wireless communication system, the method comprising:
    determining a load level of the MME; and
    transmitting, if the load level is equal to or greater than a configured load level, a reject message containing a hold time to a base station for rejecting an access request message of a specific UE,
    wherein the reject message is used by the base station, if the base station receives the access request message from the specific UE after receiving the reject message, for rejecting access request of the specific UE until the hold time elapses, and wherein the access request message comprises an access stratum (AS) message including a time-tolerant indication.

18. The method of claim 17, wherein the reject message comprises a cause value which indicates an entity in an overload status, the entity comprising at least one of a base station, the MME, an S-GW, and a P-GW, and the hold time is a time configured according to the cause value.

19. The method of claim 17, wherein the access request message comprises a radio resource control (RRC) connection request message.

20. The method of claim 17, where the message for rejecting the access request messages of the specific UE comprises an OVERLOAD START message.

21. The method of claim 17, wherein the specific UE comprises a machine type communications (MTC) device.

22. The method of claim 17, wherein the access request message is received at a time configured by the UE by comparing a weight factor included in barring information broadcasted by the base station with a tolerant level of the UE.

23. A network access control apparatus of a user equipment (UE) for a wireless communication system, the network access control apparatus comprising:
a transceiver configured to transmit and receive signals; and
a controller configured:
to control the transceiver to transmit an access request message to a base station,
to control the transceiver to receive a reject message from the base station,
to determine, if the reject message is received, a hold time contained in the reject message, and
to control the transceiver to transmit a new access request message after the hold time elapses,
wherein the reject message is received from the base station, if the base station receives a message for rejecting access request messages of a specific UE from a mobility management entity (MME) to control an overload of the MME, and
wherein the access request message comprises an access stratum (AS) message including a time-tolerant indication.

24. The network access control apparatus of claim 23, wherein the access request message comprises a time-tolerant indicator and the reject message comprises a cause value which indicates an entity in an overload status, the entity comprising at least one of the base station, the MME, an S-GW, and a P-GW, and the hold time is a time configured according to the cause value.

25. The network access control apparatus of claim 23, wherein the controller transmits, if a weight factor included in barring information broadcasted by the base station is greater than (>) a tolerant level of the UE, the new access request message after the hold time elapses.

26. The network access control apparatus of claim 23, wherein the controller configures a tolerant level, a weight factor penalty, and a hold time penalty, receives barring information having a weight factor and the hold time, and configures a time for transmitting the access request message by comparing the received barring information with the configured tolerant level and weight factor.

27. A network access control apparatus of a base station for a wireless communication system, the network access control apparatus comprising:
a transceiver configured to transmit and receive signals; and
a controller configured to control the transceiver;
to receive an overload start message having a hold time from a mobility management entity (MME),
to receive an access request message from a user equipment (UE), and
to transmit, if the UE is a specific UE indicated by the overload start message, a reject message containing the hold time to the UE,
wherein the hold time contained in the reject message is used by the UE for transmitting the access request message after the hold time elapses,
wherein the overload start message is received for ejecting the access request message of a specific UE to control an overload of the MME, and
wherein the access request message comprises an access stratum (AS) message including a time-tolerant indication.

28. The network access control apparatus of claim 27, wherein the reject message comprises a cause value which indicates an entity in an overload status, the entity comprising at least one of an the base station, the MME, a Serving-Gateway (S-GW), and a Packet data network Gateway (P-GW), and wherein the hold time is a time configured according to the cause value.

29. The network access control apparatus of claim 27, wherein the controller broadcasts barring information having a weight factor and the hold time and receives the network connection request message at a time configured by the UE by comparing the weight factor with a tolerant level of the UE.

30. A network access control apparatus of a mobility management entity (MME) for a wireless communication system, the network access control apparatus comprising:
a transceiver configured to transmit and receive signals; and
a controller configured to:
to determine a load level of the MME,
to control the transceiver to transmit, if the load level is equal to or greater than a configured load level, a reject message containing a hold time to a base station for rejecting an access request message of a specific UE, and
to control the transceiver to receive the access request message from the at least one specific UE after the hold time elapses,
wherein the reject message is used by the base station, if the base station receives the access request message from the at least one specific UE after receiving the reject message, for rejecting access request of the specific UE until the hold time elapses, and
wherein the access request message comprises an access stratum (AS) message including a time-tolerant indication.

31. The network access control apparatus of claim 30, wherein the access request message is received at a time configured by the UE by comparing a weight factor included in barring information broadcasted by a base station with a tolerant level of the UE.

* * * * *